United States Patent
Chen

(10) Patent No.: US 11,350,455 B2
(45) Date of Patent: May 31, 2022

(54) METHOD AND DEVICE FOR PERFORMING CHANNEL DETECTION ON UNLICENSED CARRIER

(71) Applicant: GUANGDONG OPPO MOBILE TELECOMMUNICATIONS CORP., LTD., Guangdong (CN)

(72) Inventor: Wenhong Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/024,867

(22) Filed: Sep. 18, 2020

(65) Prior Publication Data

US 2021/0007141 A1 Jan. 7, 2021

Related U.S. Application Data

(63) Continuation of application No. PCT/CN2018/079875, filed on Mar. 21, 2018.

(51) Int. Cl.
*H04W 74/08* (2009.01)
*H04B 7/06* (2006.01)
(Continued)

(52) U.S. Cl.
CPC ...... *H04W 74/0808* (2013.01); *H04B 7/0617* (2013.01); *H04W 16/14* (2013.01); *H04W 52/50* (2013.01)

(58) Field of Classification Search
CPC . H04W 74/0808; H04W 16/14; H04W 52/50; H04W 74/0816; H04W 74/0825;
(Continued)

(56) References Cited

U.S. PATENT DOCUMENTS

2017/0303136 A1* 10/2017 Park .................... H04B 17/102
2017/0346544 A1* 11/2017 Islam .................... H04B 7/061
(Continued)

FOREIGN PATENT DOCUMENTS

CN 107027123 8/2017
CN 107820259 3/2018
(Continued)

OTHER PUBLICATIONS

Intel Corporation, "Necessary considerations in designing NR-unlicensed technology," 3GPP TSG RAN WG1 Meeting #92, R1-1802434, Feb. 2018, 5 pages.
(Continued)

*Primary Examiner* — Mewale A Ambaye
(74) *Attorney, Agent, or Firm* — Hodgson Russ LLP

(57) ABSTRACT

Embodiments of the present application provide a method and device for transmitting information. The method includes: performing, by a first device, channel detection on a first channel on an unlicensed carrier using a first beam and a first energy detection threshold to determine whether a first time domain resource used for the first device to send first information is available; and in a case where the first time domain resource is available, sending, by the first device, the first information by the first time domain resource.

18 Claims, 4 Drawing Sheets

400

Perform, by a first device, channel detection on a first channel on an unlicensed carrier using a first beam and a first energy detection threshold to determine whether a first time domain resource used for the first device to send first information is available — S410

In a case where the first time domain resource is available, if a coverage angle of the first beam is smaller than a coverage angle of a second beam used for data transmission, the first device not sending the first information by the first time domain resource, wherein a direction corresponding to the second beam and a direction corresponding to the first beam at least partially overlap — S420

(51) Int. Cl.
*H04W 16/14* (2009.01)
*H04W 52/50* (2009.01)

(58) Field of Classification Search
CPC ....... H04W 72/04; H04W 72/12; H04W 7/02; H04W 52/243; H04B 7/0617
See application file for complete search history.

(56) References Cited

U.S. PATENT DOCUMENTS

| 2018/0343646 | A1* | 11/2018 | Chou | H04W 16/28 |
| 2019/0268939 | A1* | 8/2019 | Yang | H04W 72/042 |
| 2020/0336921 | A1* | 10/2020 | Yerramalli | H04W 16/14 |
| 2020/0389852 | A1* | 12/2020 | Wang | H04W 52/146 |
| 2021/0307063 | A1* | 9/2021 | Yerramalli | H04W 72/046 |
| 2021/0329564 | A1* | 10/2021 | Levy | H04W 52/242 |

FOREIGN PATENT DOCUMENTS

| CN | 107820684 | 3/2018 |
| JP | 2017523696 A | 8/2017 |
| WO | 2016155523 A1 | 10/2016 |
| WO | 2018028716 A1 | 2/2018 |

OTHER PUBLICATIONS

WIPO, ISR for PCT/CN2018/079875, dated Dec. 10, 2018.
EPO, Extended European Search Report EP 18910805.3, dated Feb. 9, 2021.
IPO, Examination Report for IN Application No. 202027044394, dated Sep. 10, 2021.
JPO, Office Action issued to JP Application No. 2020-550796, dated Jan. 21, 2022.
InterDigital Inc., 3GPP TSG RAN WG1, Meeting #92, R1-1802651, "Discussion on LBT in Unlicensed Higher Frequency Bands", Mar. 2018.
Oppo, 3GPP TSG RAN WG1, Meeting #92, R1-1802125, "Channel Access Mechanisms for NR Unlicensed", Mar. 2018.

* cited by examiner

100

| Perform, by a first device, channel detection on a first channel on an unlicensed carrier using a first beam and a first energy detection threshold to determine whether a first time domain resource used for the first device to send first information is available | S110 |

| In a case where the first time domain resource is available, send, by the first device, the first information by the first time domain resource | S120 |

FIG. 1

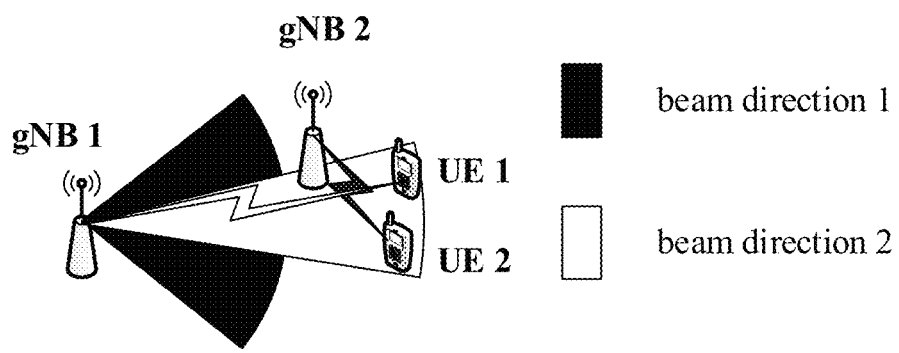

FIG. 2

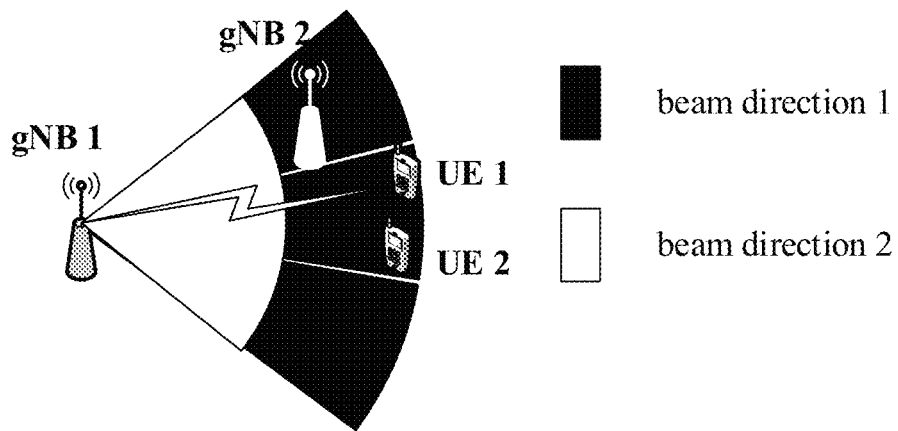

| Perform, by a first device, channel detection on a first channel on an unlicensed carrier using a first beam and a first energy detection threshold to determine whether a first time domain resource used for the first device to send first information is available | S410 |

| In a case where the first time domain resource is available, if a coverage angle of the first beam is smaller than a coverage angle of a second beam used for data transmission, the first device not sending the first information by the first time domain resource, wherein a direction corresponding to the second beam and a direction corresponding to the first beam at least partially overlap | S420 |

FIG. 4

METHOD AND DEVICE FOR PERFORMING CHANNEL DETECTION ON UNLICENSED CARRIER

CROSS-REFERENCE TO RELATED APPLICATION

This application is a continuation of International Application No. PCT/CN2018/079875, filed Mar. 21, 2018, the entire disclosure of which is incorporated herein by reference.

TECHNICAL FIELD

Embodiments of the present disclosure generally relate to communication technologies, and more particularly, to information transmission methods and devices.

BACKGROUND

In the Licensed-Assisted Access (LAA-LTE) system which is based on Long Term Evolution (LTE), the carrier on the licensed spectrum is used as a main carrier, and the carrier on the licensed spectrum is used as an auxiliary carrier to provide services for terminal devices. On the unlicensed spectrum, communication devices follows a "Listen Before Talk (LBT)" principle, that is, the communication devices need to perform channel detection before sending signals on the unlicensed spectrum channel, and only when the channel detection result is that the channel is idle, the communication devices can send signals; if the result of the channel detection performed by the communication devices on the unlicensed spectrum channel is that the channel is busy, the communication devices cannot send signals.

When the New Radio (NR) technology is applied to the unlicensed carrier, the beamforming technology is introduced to improve the spatial multiplexing transmission capacity of cells. In this case, how to perform channel detection to transmit data is a question that deserves researches.

SUMMARY

Embodiments of the present disclosure provide an information transmission method and device which can perform data transmission on an unlicensed carrier.

According to a first aspect, there is provided an information transmission method, including:

performing, by a first device, channel detection on a first channel on an unlicensed carrier using a first beam and a first energy detection threshold to determine whether a first time domain resource used for the first device to send first information is available; and in a case where the first time domain resource is available, sending, by the first device, the first information by the first time domain resource.

Therefore, in embodiments of the present disclosure, the first device can use the first beam and the first energy detection threshold to perform channel detection to determine whether a time domain resources for data transmission is available. Further, if the time domain resource is available, the first device performs data transmission by the time domain resource. In this way, data transmission on an unlicensed carrier can be realized.

According to an exemplary embodiment, the first energy detection threshold is determined according to a first transmit power;

sending, by the first device, the first information by the first time domain resource, includes:

sending, by the first device, the first information by the first time domain resource with a second transmit power, wherein the second transmit power is different from the first transmit power.

Therefore, in embodiments of the present disclosure, the first device can make the channel detection range greater than or equal to the data transmission range by controlling the second transmit power used for signal transmission and the first transmit power used for channel detection, thereby avoiding the interference of data transmission to other communication links and ensuring the effective transmission of data.

According to an exemplary embodiment, sending, by the first device, the first information by the first time domain resource, includes:

sending, by the first device, the first information by the first time domain resource using a second beam, wherein the second beam is different from the first beam, and a direction corresponding to the second beam and a direction corresponding to the first beam at least partially overlap.

It should be noted that, in embodiments of the present disclosure, the spatial domain coverage range corresponding to a beam may be jointly determined by the direction, the coverage angle, and the signal amplitude (or beam gain) corresponding to the beam. If the spatial domain coverage range corresponding to the first beam used for receiving signals is exactly the same as the spatial domain coverage range corresponding to the second beam used for transmitting, the first beam and the second beam can be considered the same; otherwise, the first beam and the second beam are different. The spatial domain coverage range corresponding to the first beam and the spatial domain coverage range corresponding to the second beam being exactly the same may mean that, assuming the same signal amplitude, the direction and the coverage angle corresponding to the first beam are the same as the direction and the coverage angle corresponding to the second beam.

According to an exemplary embodiment, the first beam is a beam in a first beam set, and the second beam is a beam in a second beam set.

According to an exemplary embodiment, the direction corresponding to the first beam includes the direction corresponding to the second beam, and a coverage angle of the first beam is larger than a coverage angle of the second beam.

According to an exemplary embodiment, a beam gain of the first beam is smaller than a beam gain of the second beam, and the second transmit power is smaller than the first transmit power.

According to an exemplary embodiment, the second transmit power is equal to the first transmit power minus an adjustment amount, and the adjustment amount is based on a difference between the beam gain of the second beam and the beam gain of the first beam.

According to an exemplary embodiment, a beam gain of the first beam is greater than a beam gain of the second beam, and the second transmit power is greater than the first transmit power.

According to an exemplary embodiment, the second transmit power is equal to the first transmit power plus an adjustment amount, and the adjustment amount is determined based on a difference between the beam gain of the second beam and the beam gain of the first beam.

According to embodiments, the adjustment amount X may be the difference between the beam gain of the first beam and the beam gain of the second beam. For example, the X may be the power difference between the beam gain of the first beam and the beam gain of the second beam; or the X may be the energy difference between the beam gain of the first beam and the beam gain of the second beam; or, the X may be the signal-to-noise ratio difference between the beam gain of the first beam and the beam gain of the second beam.

According to an exemplary embodiment, the beam gain of the first beam is greater than the beam gain of the second beam, and the second transmit power is equal to the first transmit power.

According to an exemplary embodiment, the method further includes:

receiving, by the first device, first indication information sent from a second device, wherein the first indication information is used to indicate information of the second beam; and determining, by the first device, information of the first beam according to the information of the second beam.

According to an exemplary embodiment, the method further includes:

receiving, by the first device, second indication information sent from the second device, wherein the second indication information is used to indicate the information of the first beam.

According to an exemplary embodiment, the method further includes:

receiving, by the first device, third indication information sent from the second device, wherein the third indication information is used to determine information of the second transmit power; and determining, by the first device, the first transmit power according to the information of the second transmit power.

According to an exemplary embodiment, the method further includes: the first device is a network device.

According to an exemplary embodiment, the method further includes: the first device is a terminal device.

According to a second aspect, there is provided an information transmission method, including:

performing, by a first device, channel detection on a first channel on an unlicensed carrier using a first beam and a first energy detection threshold to determine whether a first time domain resource used for the first device to send first information is available; and in a case where the first time domain resource is available, if a coverage angle of the first beam is smaller than a coverage angle of a second beam used for data transmission, the first device not sending the first information by the first time domain resource, wherein a direction corresponding to the second beam and a direction corresponding to the first beam at least partially overlap.

According to an exemplary embodiment, the first beam is a beam in a first beam set, and the second beam is a beam in a second beam set.

According to an exemplary embodiment, the method further includes:

receiving, by the first device, first indication information sent from a second device, wherein the first indication information is used to indicate information of the second beam; and determining, by the first device, information of the first beam according to the information of the second beam.

According to an exemplary embodiment, the method further includes:

receiving, by the first device, second indication information sent from the second device, wherein the second indication information is used to indicate the information of the first beam.

According to an exemplary embodiment, the method further includes: the first device is a network device.

According to an exemplary embodiment, the method further includes: the first device is a terminal device.

According to a third aspect, there is provided an information transmission device which is configured to perform the methods according to the first aspect or any exemplary embodiment in the first aspect. Specifically, the device includes units for performing the methods according to the first aspect or any exemplary embodiment in the first aspect.

According to a fourth aspect, there is provided an information transmission device, including a memory, a processor, an input interface, and an output interface. The memory, the processor, the input interface and the output interface are connected through a bus system. The memory is configured to store instructions, and the processor is configured to execute the instructions stored in the memory to perform the methods according to the first aspect or any exemplary embodiment in the first aspect.

According to a fifth aspect, there is provided an information transmission device which is configured to perform the methods according to the second aspect or any exemplary embodiment in the second aspect. Specifically, the device includes units for performing the methods according to the second aspect or any exemplary embodiment in the second aspect.

According to a sixth aspect, there is provided an information transmission device, including a memory, a processor, an input interface, and an output interface. The memory, the processor, the input interface and the output interface are connected through a bus system. The memory is configured to store instructions, and the processor is configured to execute the instructions stored in the memory to perform the methods according to the second aspect or any exemplary embodiment in the second aspect.

According to a seventh aspect, there is provided a computer storage medium for storing computer software instructions configured to perform the methods according to the first aspect or any exemplary embodiment in the first aspect, the computer software instructions containing programs designed to perform the above aspects.

According to an eighth aspect, there is provided a computer program product including instructions. When the instructions run on a computer, the computer is caused to perform the methods according to the first aspect or any exemplary embodiment in the first aspect.

According to a ninth aspect, there is provided a computer storage medium for storing computer software instructions configured to perform the methods according to the second aspect or any exemplary embodiment in the second aspect, the computer software instructions containing programs designed to perform the above aspects.

According to an eighth aspect, there is provided a computer program product including instructions. When the instructions run on a computer, the computer is caused to perform the methods according to the second aspect or any exemplary embodiment in the second aspect.

BRIEF DESCRIPTION OF THE DRAWINGS

FIG. 1 shows a schematic flowchart of an information transmission method according to an embodiment of the present disclosure.

FIG. 2 shows a schematic diagram of an application scenario of an embodiment of the present disclosure.

FIG. 3 shows a schematic diagram of another application scenario of an embodiment of the present disclosure.

FIG. 4 shows a schematic flowchart of an information transmission method according to an embodiment of the present disclosure.

DETAILED DESCRIPTION

Figure 5:
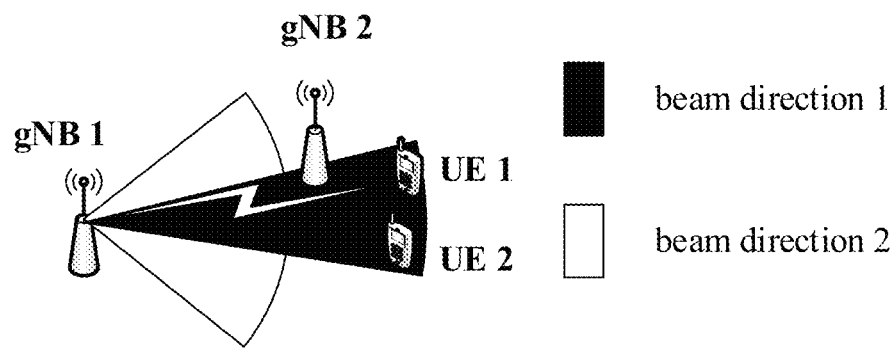
FIG. 5 shows a schematic diagram of an application scenario of an embodiment of the present disclosure.

Technical solutions according to embodiments of the present disclosure will be described below in conjunction with the drawings.

Embodiments of the present disclosure can be applied to various communication systems, such as, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolution system of NR system, LTE-based access to unlicensed spectrum (LTE-U) system, NR-based access to unlicensed spectrum (NR-U) system, Universal Mobile Telecommunication System (UMTS), Wireless Local Area Networks (WLAN), Wireless Fidelity (WiFi), next-generation communication system or other communication systems, etc.

Generally speaking, traditional communication systems support a limited number of connections and are easy to implement. However, with the development of communication technologies, mobile communication systems will not only support traditional communications, but also support, for example, Device to Device (Device to Device, D2D) communications, Machine to Machine (M2M) communications, Machine Type Communication (MTC), and Vehicle to Vehicle (V2V) communications, etc. Embodiments of the present disclosure can be applied to these communications systems.

The communication systems in embodiments of the present disclosure can be applied to a Carrier Aggregation (CA) scenario, can also be applied to a Dual Connectivity (DC) scenario, and can also be applied to a standalone (SA) network deployment scenario.

The spectrum which embodiments of the present disclosure can be applied in is not limited. For example, embodiments of the present disclosure may be applied to licensed spectrum or unlicensed spectrum.

Embodiments of the present disclosure are described in combination with a network device and a terminal device. The terminal device may also be called User Equipment (UE), access terminal, user unit, user station, mobile station, mobile terminal, remote station, remote terminal, mobile device, user terminal, terminal, wireless communication device, user agent or user device, etc. The terminal device can be a station (ST) in a WLAN, a cellular phone, a cordless phone, a Session Initiation Protocol (SIP) phone, a Wireless Local Loop (WLL) station, or a Personal Digital Assistant (PDA) device, a handheld device with wireless communication capabilities, a computing device or other processing device connected to a wireless modem, a vehicle-mounted device, a wearable device, or a terminal device in a next-generation communication system, such as a terminal device in the NR network or a terminal device in a future evolved Public Land Mobile Network (PLMN) network.

By way of example and not limitation, in embodiments of the present disclosure, the terminal device may also be a wearable device. The wearable device can also be referred to as a wearable smart device, which is a general term for applying wearable technology to intelligently design everyday wear and develop wearable devices, such as glasses, gloves, watches, clothing and shoes. A wearable device is a portable device that is worn directly on the body or integrated into users' clothes or accessories. The wearable device is not only a hardware device, but also realize powerful functions through software support, data interaction, and cloud interaction. Generalized wearable smart devices include full-featured and large-sized devices which can realize complete or partial functions that do not depend on smart phones, such as smart watches or smart glasses, and devices that only focus on a certain type of application functions, and need to cooperate with other devices like smart phones, such as smart bracelets for sign monitoring, or smart jewelry.

The network device may be a device for communicating with a mobile device. The network device may be an Access Point (AP) in WLAN, a base station (BTS, Base Transceiver Station) in GSM or CDMA, or a base station (NB, NodeB) in WCDMA, an evolved base station in LTE (Evolutional Node B, eNB or eNodeB), or a relay station or an access point, or a vehicle-mounted device, a wearable device, a network device in an NR network, or a network device in future evolved PLMN network.

In embodiments of the present disclosure, the network device provides services for a cell, and the terminal device communicates with the network device through transmission resources (for example, frequency domain resources, or spectrum resources) used by the cell. The cell may be a cell corresponding to the network device (for example, base station). The cell may belong to a macro base station or a base station corresponding to a small cell. The small cell here may include: a metro cell, a micro cell, a pico cell, a femto cell, etc. These small cells have the characteristics of small coverage and low transmit power, and are suitable for providing high-speed data transmission services.

The downlink physical channel in embodiments of the present application may include a Physical Downlink Control Channel (PDCCH), an Enhanced Physical Downlink Control Channel (EPDCCH), a Physical Downlink Shared Channel (PDSCH), a Physical Hybrid ARQ Indicator Channel (PHICH), a Physical Multicast Channel (PMCH), or a Physical Broadcast Channel (PBCH), etc. The downlink reference signal may include a downlink synchronization signal, a Phase Tracking Reference Signal (PT-RS), a downlink DeModulation Reference Signal (DMRS), or a Channel State Information-Reference Signal (CSI-RS), etc. The downlink synchronization signal can be used for communication devices to access networks and for radio resource management measurement, the downlink DMRS can be used for downlink channel demodulation, the CSI-RS can be used for downlink channel measurement, downlink time-frequency synchronization or phase tracking, and the PT-RS can also be used for downlink channel measurement, downlink time-frequency synchronization or phase tracking. It should be understood that embodiments of the present application may include downlink physical channels or downlink reference signals which have the same names as described above but have different functions, or may include downlink physical channels or downlink reference signals which have different names from the above but have the same functions. Embodiments of the present disclosure do not impose specific limitations on this.

The uplink physical channel in embodiments of the present application may include a Physical Random Access Channel (PRACH), a (Physical Uplink Control Channel (PUCCH), or a Physical Uplink Shared Channel (PUSCH), or the like. The uplink reference signal may include an uplink DeModulation Reference Signal (DMRS), a Sounding Reference Signal (SRS), a Phase Tracking Reference Signal (PT-RS), or the like. The uplink DMRS can be used for uplink channel demodulation, the SRS can be used for uplink channel measurement, uplink time-frequency synchronization or phase tracking, and the PT-RS can also be used for uplink channel measurement, uplink time-frequency synchronization or phase tracking. It should be understood that embodiments of the present application may include uplink physical channels or uplink reference signals which have the same names as described above but have different functions, or may include uplink physical channels or uplink reference signals which have different names from the above but have the same functions. Embodiments of the present disclosure do not impose specific limitations on this.

The information transmission methods according to embodiments of the present disclosure will be described below with reference to FIGS. 1 to 5. It should be understood that FIGS. 1 to 5 are schematic flowcharts of the method for transmitting information according to embodiments of the present disclosure, showing the details of the method. However, these steps or operations are only examples, and embodiments of the present disclosure may also include other operations or variations of the various operations in FIGS. 1 to 5.

In addition, the steps in FIGS. 1 to 5 may be performed in a different order from that shown in FIGS. 1 to 5, and it is possible that not all operations in FIGS. 1 to 5 are performed.

FIG. 1 is a schematic flowchart of an information transmission method 100 according to an embodiment of the present disclosure. As shown in FIG. 1, the method 100 may include the following content:

In S110, a first device performs channel detection on a first channel on an unlicensed carrier using a first beam and a first energy detection threshold to determine whether a first time domain resource used for the first device to send first information is available.

In S120, in a case where the first time domain resource is available, the first device sends the first information by the first time domain resource.

According to embodiments, the first device may be a network device or a terminal device. Therefore, embodiments of the present disclosure may be applied to a channel access process of a network device or terminal device on an unlicensed spectrum.

In embodiments of the present disclosure, the channel access process of the network device or the terminal device may include: determining whether the channel is available by detecting whether the channel is in an idle state.

For example, the network device and/or the terminal device can detect whether a frequency domain resource with a certain bandwidth (for example, 20 MHz) is currently in an idle state, in other words, whether the frequency domain resource is used by other devices.

If the frequency domain resource is in an idle state, in other words, the frequency domain resource is not used by other devices (that is, the channel is idle), the network device and/or terminal device can use the frequency domain resource for communication, for example, for uplink transmission or downlink transmission, etc.

If the frequency domain resource is not in an idle state, in other words, the frequency domain resource has been used by other devices (that is, the channel is occupied), the network device and/or terminal device cannot use the frequency domain resource.

According to embodiments, the first device may use the first beam and the first energy detection threshold to perform channel detection on the first channel on the unlicensed carrier. The first energy detection threshold is an energy detection threshold corresponding to the first transmit power. According to embodiment, channel detection may mean that the first device can collect the signal energy on the first channel for a period of time, and compare the energy value with the first energy detection threshold; if the energy value is greater than or equal to the first energy detection threshold, it can be considered that the channel is occupied, and the first time domain resource for sending the first information can be determined to be unavailable; or, if the energy value is smaller than the first energy detection threshold, it can be considered that the channel is idle, and the first time domain resource can be determined to be available. Further, the first information can be sent on the first time domain resource.

According to embodiments, the first energy detection threshold may be determined according to the transmit power used by the first device for signal transmission. For example, the smaller the transmit power is, the larger the corresponding energy detection threshold will be; the larger the transmit power is, the smaller the corresponding energy detection threshold will be.

It should be understood that, in embodiments of the present disclosure, the beam used to receive a signal (or called the receiving beam) can be understood as a spatial domain reception filter used to receive a signal. Accordingly, a beam used to send a signal (or called the sending beam) can be understood as a spatial domain transmission filter used to send a signal. For two signals sent using the same spatial domain transmission filter, it can be said that the two signals are Quasi-Co-Located (QCL) relative to the spatial receiving parameters.

In embodiments of the present disclosure, the first beam used for channel detection (that is, one or more of the receiving beams) and the second beam used for signal transmission (that is, one or more of the sending beams) may be the same beam or different beams, and embodiments of the present disclosure do not impose specific limitations on this. It should be understood that when the first beam used for channel detection and the second beam used for signal transmission are different beams, the spatial domain coverage range of the first beam and the spatial domain coverage range of the second beam at least partially overlap.

In embodiments of the present disclosure, the direction corresponding to the first beam may be omnidirectional, that is, the first device may perform omnidirectional channel detection, and then may perform directional data transmission.

It should be understood that in embodiments of the present disclosure, the beam may include precoding processing in a data domain, or may include precoding processing in an analog domain, or may include precoding processing in the data domain and the analog domain, and embodiments of the present disclosure do not impose specific limitations on this.

In existing communication systems, there may be situation where the transmission beam(s) and the receiving beam(s) do not completely match. For example, when performing channel detection, the communication device can use reception precoding in a wider direction; but, when sending a signal, the communication device can use transmission precoding in the narrower direction to improve the beamforming gain of data transmission. For another example, a communication device can use omnidirectional reception for channel detection, but use a beamforming method for signal transmission. These may cause the situation where the transmission beam(s) and the receiving beam(s) do not completely match.

Take the downlink transmission between network devices and terminal devices as an example. As shown in FIG. 2, before gNB1 provides services to UE1, gNB1 can use beam direction 1 to perform channel detection with regard to the interference in the direction of UE1 based on the energy detection threshold corresponding to transmit power P. If the channel is found to be idle, gNB1 can use transmit power P and beam direction 2 to transmit data to UE1. If the beamforming gain (i.e. beam gain) of beam direction 2 is greater than the beamforming gain of beam direction 1, the data transmission range of gNB1 will exceed the channel detection range of gNB1, and the data transmission from gNB1 to UE1 will affect the communication link around UE1, for example, the communication link between gNB2 and UE2.

Aiming at the above technical problems, as an embodiment, S120 may specifically include:

sending, by the first device, the first information by the first time domain resource with a second transmit power, wherein the second transmit power is different from the first transmit power and the first transmit power is used to determine the first energy detection threshold.

As can be seen from the above description, if the channel detection range is smaller than the data transmission range, data transmission may cause interference on other communication links. Also, because the data transmission range exceeds the channel detection range, there may be resources on some channels that are not available. Thus, data transmission on these resources may cause data transmission failure and affect the reliability of data transmission.

Therefore, in embodiments of the present disclosure, the first device can make the channel detection range greater than or equal to the data transmission range by controlling the second transmit power used for signal transmission and the first transmit power used for channel detection, thereby avoiding the interference of data transmission to other communication links and ensuring the effective transmission of data.

It should be understood that, in embodiments of the present disclosure, the second beam used by the first device to send the first information with the second transmit power and the first beam used for channel detection with the energy detection threshold corresponding to the first transmit power may be the same or different, which is not limited in embodiments of the present disclosure, as long as the channel detection range can be greater than or equal to the data transmission range by controlling the relationship between the second transmit power and the first transmit power.

It should be noted that, in embodiments of the present disclosure, the spatial domain coverage range corresponding to a beam may be jointly determined by the direction, the coverage angle, and the signal amplitude (or beam gain) corresponding to the beam. If the spatial domain coverage range corresponding to the first beam used for receiving signals is exactly the same as the spatial domain coverage range corresponding to the second beam used for transmitting, the first beam and the second beam can be considered the same; otherwise, it can be considered that the first beam and the second beam are different. The spatial domain coverage range corresponding to the first beam and the spatial domain coverage range corresponding to the second beam being exactly the same may mean that, the direction, the coverage angle and the beam gain corresponding to the first beam are the same as the direction, the coverage angel and the beam gain corresponding to the second beam. According to an embodiment, the smaller the coverage angle of a beam is, the larger the beam gain corresponding to the beam will be; on the contrary, the larger the coverage angle of a beam, the smaller the beam gain the corresponding to the beam will be.

Aiming at the technical problem shown in FIG. 2, as another embodiment, S120 may specifically include:

sending, by the first device, the first information by the first time domain resource using a second beam, wherein the second beam is different from the first beam.

Here, the second beam being different from the first beam may mean that at least one of the coverage angle and signal amplitude of the first beam and the second beam is different, and the direction corresponding to the first beam and the corresponding direction of the second beam at least partially overlap. The first device uses a second beam which is different from the first beam used for channel detection, to perform data transmission. In this way, the first device can control the spatial domain coverages of the first beam and the second beam (for example, by controlling the energy detection threshold, the signal transmit power, or the selection of the first beam and the second beam, etc.) to make the channel detection range at least cover the data transmission range, thereby avoiding the interference of data transmission to other communication links.

It should be understood that, in the embodiment, the second transmit power used by the first device to send the first information and the first transmit power corresponding to the energy detection threshold used by the first device for channel detection may be equal, or may be different, which is not limited in the embodiment of the present disclosure. That is, in this embodiment, the first device may control the spatial domain coverage range of the first beam and the spatial domain coverage range of the second beam, to make the channel detection range greater than or equal to the data transmission range.

According to embodiments, the first beam may be a beam in a first beam set, and the second beam may be a beam in a second beam set. The first beam set may be a set of beams used for channel detection (or signal reception), and the second beam set may be a set of beams used for signal transmission. At least one beam in the first beam set and the second beam set is different. For example, the amounts of beams included in the first beam set and the second beam set are different, the first beam set includes N beams, where N is a positive integer, the N beams correspond to different directions, and the second beam set includes M beams, where M is a positive integer, the M beams correspond to different directions. The N beams in the first beam set and the M beams in the second beam set correspond to the same direction and coverage angle. Assuming M=2*N, the direction and coverage angle corresponding to one beam in the first beam set are the same as the joint direction and coverage angle corresponding to two beams in the second beam set. In this case, the beam gain of one beam in the first beam set is smaller than the beam gain of one beam in the second beam set.

In some embodiments, the first device may also control the channel detection range at least cover the data transmission rang by considering information of the beams and the transmit power(s).

For example, in the case where the information (for example, corresponding direction, coverage angle, signal amplitude or beam gain) of the first beam and the second beam is determined, the first device may control the first transmit power and the second transmit power so as to control the channel detection range and the data transmission range.

It should be understood that the data transmission in embodiments of the present disclosure may be the transmission of a physical channel or the transmission of a reference signal, the physical channel includes an uplink physical channel or a downlink physical channel, and the reference signal includes an uplink reference signal or a downlink reference signal, and embodiments of the present disclosure do not impose specific limitations on this.

In embodiments of the disclosure, the first device may determine the first transmit power, the second transmit power, the information of the first beam, and the information of the second beam by itself. For example, the first device may first determine the first transmit power, and then determine the second transmit power according to the first transmit power. Alternatively, the first device may first determine the second transmit power, and then determine the first transmit power according to the second transmit power. Alternatively, the first device may determine the first transmit power and the second transmit power at the same time.

In embodiments of the present invention, for the first beam, the second beam, the first transmit power, and the second transmit power, the first device may determine the fourth parameter through any three of the parameters, and embodiments of the present disclosure do not impose specific limitations on this. For example, the first device may first determine the first beam, the second beam, and the first transmit power, and then determine the second transmit power for data transmission according to these three parameters. For another example, the first device may first determine the first beam, the second beam, and the second transmit power, and then determine the first transmit power according to these three parameters, thereby determining the energy detection threshold corresponding to the first transmit power for channel detection.

Case 1: The corresponding direction and coverage angle of the first beam are greater than the corresponding direction and coverage angle of the second beam, and the signal amplitude of the first beam is smaller than the signal amplitude of the second beam, in other words, the beam gain of first beam is smaller than the beam gain of the second beam, for example, the scenario shown in FIG. 2.

In this case, the first device may perform channel detection using the first beam and the first energy detection threshold corresponding to the first transmit power; after the channel detection is successful (i.e., the channel detection result is that the channel is idle), the first device send data with the second transmit power. The second transmit power is smaller than the first transmit power.

According to embodiments, the first device may control the difference between the first transmit power P1 and the second transmit power P2 to be greater than or equal to a specific adjustment amount X, so that the data transmission range can fall within the channel detection range, that is, the channel detection range covers at least the data transmission range. The adjustment amount X is determined according to the difference between the beam gain of the second beam and the beam gain of the first beam.

According to embodiments, X may be the difference between the beam gain of the first beam and the beam gain of the second beam. For example, the X may be the power difference between the beam gain of the first beam and the beam gain of the second beam; or, the X may be the energy difference between the beam gain of the first beam and the beam gain of the second beam; or, the X may be the signal-to-noise ratio difference between the beam gain of the first beam and the beam gain of the second beam.

In embodiments of the present disclosure, the beam gain of the first beam can also be understood as the first precoding gain obtained based on the first precoding corresponding to the first beam, and the beam gain of the second beam can be understood as the second precoding gain obtained based on the second precoding corresponding to the second beam.

Correspondingly, the X may be the power difference between the first precoding gain and the second precoding gain; or, the X may be the energy difference between the first precoding gain and the second precoding gain; or, the X may be the signal-to-noise ratio difference between the first precoding gain and the second precoding gain.

For example, it is assumed that the first device plans to use the second beam and second transmit power to perform data transmission, and plans to use the first beam for channel detection. The direction and coverage angle corresponding to the first beam includes (or covers) the direction and coverage angle corresponding to the second beam, the beam gain of the first beam is 3 dB, the beam gain of the second beam is 6 dB, and the second transmit power P2 is 17 dBm. Then, the first device determines the difference between the beam gain of the first beam and the beam gain of the second beam as X=6 dB−3 dB=3 dB. Correspondingly, the first transmit power P1 should be greater than or equal to the sum of the second transmit power P2 and X, that is, P1 should be greater than or equal to 17+3=20 dBm, that is, the first device should determine the first energy detection threshold based on the first transmit power not smaller than 20 dBm.

Therefore, in the case where the corresponding direction and coverage angle of the first beam used for channel detection are greater than the corresponding direction and coverage angle of the second beam used for data transmission, if the beam gain of the first beam is smaller than the beam gain of the second beam, the first device can perform channel detection with a larger first transmit power, or the first device can perform data transmission with a smaller second transmit power, so that the data transmission range is smaller than or equal to the channel detection range, which can further reduce the interference to other communication links resulted from mismatch of the transmitting beam and the receiving beam.

Case 2: The corresponding direction and coverage angle of the first beam are greater than the corresponding direction and coverage angle of the second beam, and the signal amplitude of the first beam is greater than the signal amplitude of the second beam, in other words, the beam gain of the first beam is greater than the beam gain of the second beam, for example, the scenario shown in FIG. 3.

It should be understood that in this case, the first beam may include multiple beams. For example, in FIG. 3, the first beam includes three beams, and the second beam includes one beam.

In this case, the first device may perform channel detection using the first beam and the first energy detection threshold corresponding to the first beam; after the channel detection is successful (that is, the channel detection result is that the channel is idle), the first device uses the second transmit power to perform data transmission. The second transmit power is equal to the first transmit power.

According to some embodiment, the first device may perform channel detection using the first beam and the first energy detection threshold corresponding to the first beam; after the channel detection is successful (that is, the channel detection result is that the channel is idle), the first device uses the second transmit power to perform data transmission. The second transmit power is greater than the first transmit power.

According to embodiments, the first device may control the difference between the second transmit power P2 and the first transmit power P1 to be smaller than or equal to a specific adjustment amount X, so that the data transmission range can fall within the channel detection range, that is, channel detection range covers at least the data transmission range. The adjustment amount X is determined according to the difference between the beam gain of the first beam and the beam gain of the second beam.

According to embodiments, X may be the difference between the beam gain of the first beam and the beam gain of the second beam. For example, the X may be the power difference between the beam gain of the first beam and the beam gain of the second beam; or, the X may be the energy difference between the beam gain of the first beam and the beam gain of the second beam; or, the X may be the signal-to-noise ratio difference between the beam gain of the first beam and the beam gain of the second beam.

In embodiments of the present disclosure, the beam gain of the first beam can also be understood as the first precoding gain obtained based on the first precoding corresponding to the first beam, and the beam gain of the second beam can be understood as the second precoding gain obtained based on the second precoding corresponding to the second beam.

Correspondingly, the X may be the power difference between the first precoding gain and the second precoding gain; or, the X may be the energy difference between the first precoding gain and the second precoding gain; or, the X may be signal-to-noise ratio difference between the first precoding gain and the second precoding gain.

For example, it is assumed that the first device plans to use the second beam and the second transmit power for data transmission, and plans to use the first beam for channel detection. The first beam includes two beams, and the joint direction and the coverage angle corresponding to the two beams included in the first beam include (or cover) the direction and coverage angle corresponding to the second beam. The beam gain of each of the 2 beams included in the first beam is 6 dB, the beam gain of the second beam is 3 dB, and the second transmit power P2 is 20 dBm. The first device determines the difference between the beam gain of the first beam and the beam gain of the second beam as X=6 dB−3 dB=3 dB. Accordingly, the first transmit power P1 should be greater than or equal to the difference between the transmit power P2 and X, that is, P1 should be greater than or equal to 20−3=17 dBm, that is, the first device should determine the first energy detection threshold based on the first transmit power not smaller than 17 dBm.

Therefore, in the case where the corresponding direction and coverage angle of the first beam used for channel detection are greater than the corresponding direction and coverage angle of the second beam used for data transmission, if the beam gain of the first beam is greater than the beam gain of the second beam, the first device can perform channel detection with a smaller first transmit power, or the first device can perform data transmission with a larger second transmit power, so that the data transmission range is smaller than or equal to the channel detection range, which can increase the transmit power for data transmission and ensure reliability of data transmission in the case of interference on other communication links due to the mismatch between the transmission beam and the receiving beam.

In some embodiments, the method 100 may further include:

receiving, by the first device, first indication information sent from a second device, wherein the first indication information is used to indicate information of the second beam; and determining, by the first device, information of the first beam according to the information of the second beam.

According to some embodiments, the first device is a terminal device, and the second device may be a network device, or may be another terminal device, which is not limited in embodiments of the present disclosure. That is, when the first device is a terminal device, the information of the second beam used for signal transmission may be indicated by the second device (for example, a network device).

According to other embodiments, the first device is a network device, and the second device is a terminal device. That is, when the first device is a network device, the information of the second beam used for signal transmission may be measured and reported by the terminal device.

According to embodiments, the information of the second beam may be the beam identifier of the second beam, or the second precoding information corresponding to the second beam, or the signal index of a reference signal which has a Quasi Co-Located (QCL) relationship with the second beam. Further, the first device may determine the information of the first beam used for channel detection according to the information of the second beam. For example, the first device may determine that the spatial domain coverage range of the beam includes the spatial domain coverage range of the second beam, and the like.

In some embodiments, the method 100 may further include:

receiving, by the first device, second indication information sent from the second device, wherein the second indication information is used to indicate the information of the first beam.

According to some embodiments, the first device is a terminal device, and the second device may be a network device, or may be another terminal device, which is not limited in embodiments of the present disclosure. That is, the second device (for example, a network device) may indicate to the first device (for example, a terminal device) the information of the first beam used for channel detection.

According to other embodiments, the first device is a network device, and the second device is a terminal device. That is, when the first device is a network device, the information of the first beam used for channel detection may be measured and reported by the terminal device.

According to embodiments, the information of the first beam may be the beam identifier of the first beam, or the first precoding information corresponding to the first beam, or the signal index of a reference signal which has a Quasi Co-Located (QCL) relationship with the first beam.

In summary, the information of the second beam may be indicated by the second device, and the information of the first beam may be indicated by the second device, or may also be determined by the first device according to the information of the second beam.

In some embodiments, when the first device is a terminal device, the method 100 further includes:

receiving, by the first device, third indication information sent from the second device, wherein the third indication information is used to determine information of the second transmit power; and determining, by the first device, the first transmit power according to the information of the second transmit power According to embodiments, the second device may be a network device, or may also be another terminal device, which is not limited in embodiments of the present disclosure.

That is, the second device can indicate the information of the second transmit power used to perform signal transmission. Further, the first device can determine the information of the first transmit power for channel detection according to the information of the second transmit power.

According to embodiments, the first device may determine the first transmit power used for channel detection according to the information of the second transmit power in combination with the information of the second beam or the information of the first beam. For example, the first device may determine the difference between the beam gains of the first beam and the second beam plus the second transmit power as the first transmit power. Details can be found in the description regarding the previous embodiments and repeated descriptions are omitted here.

It should be understood that in embodiments of the present disclosure, the first indication information, the second indication information, and the third indication information may be the same indication information or different indication information, and embodiments of the present disclosure do not impose specific limitations on this.

According to embodiments, the first indication information, the second indication information, or the third indication information may be carried by existing messages or signaling, for example, physical layer signaling or higher layer signaling. Alternatively, a newly added message or signaling may be used to carry the indication information, and embodiments of the present disclosure do not impose specific limitations on this.

FIG. 4 is a schematic flowchart of an information transmission method 400 according to an embodiment of the present disclosure. As shown in FIG. 4, the method 400 includes the following content:

In S410, the first device performs channel detection on a first channel on an unlicensed carrier using a first beam and a first energy detection threshold to determine whether a first time domain resource used for the first device to send first information is available.

In S420, in a case where the first time domain resource is available, if a coverage angle of the first beam is smaller than a coverage angle of a second beam used for data transmission, the first device does send the first information by the first time domain resource. A direction corresponding to the second beam and a direction corresponding to the first beam at least partially overlap.

In the embodiment, the coverage angle of the first beam used for channel detection is smaller than the coverage angle of the second beam used for signal transmission, that is, the channel detection range is smaller than the data transmission range, in other words, the channel detection range does not completely cover the data transmission range, for example, in the scenario shown in FIG. 5. In this case, even if the first time domain resource is available, the first device may not use the first time domain resource for data transmission, thereby avoiding interference on other communication links on the unlicensed spectrum.

Optionally, in the embodiment, the first device may first determine the coverage angle of the first beam and the coverage angle of the second beam, and determine whether to perform data transmission on the first time domain resource according to the comparison between the coverage angels. For example, when the coverage angle of the first beam is smaller than the coverage angle of the second beam, the first device may directly determine not to perform data transmission on the first channel, without the need for channel detection, so as to avoid waste of communication resources; or, when the coverage angle of the first beam is greater than the coverage angle of the second beam, the first device may perform channel detection on the first channel to determine whether to perform subsequent data transmission, the specific implementation process can be found in relevant description of the foregoing embodiments.

According to some embodiments, the first beam is a beam in a first beam set, and the second beam is a beam in a second beam set.

According to some embodiments, the method 400 further includes:

receiving, by the first device, first indication information sent from a second device, wherein the first indication information is used to indicate information of the second beam; and determining, by the first device, information of the first beam according to the information of the second beam.

According to some embodiments, the method 400 further includes:

receiving, by the first device, second indication information sent from the second device, wherein the second indication information is used to indicate the information of the first beam.

According to some embodiments, the first device is a network device.

According to some embodiments, the first device is a terminal device.

The method embodiments of the present disclosure are described in detail above with reference to FIGS. 1 to 5, and device embodiments of the present disclosure will be described in detail below with reference to FIGS. 6 to 9. It should be understood that the device embodiments and the method embodiments correspond to each other, details regarding the device embodiments can be found in the previous descriptions regarding the method embodiments.

Figure 6:
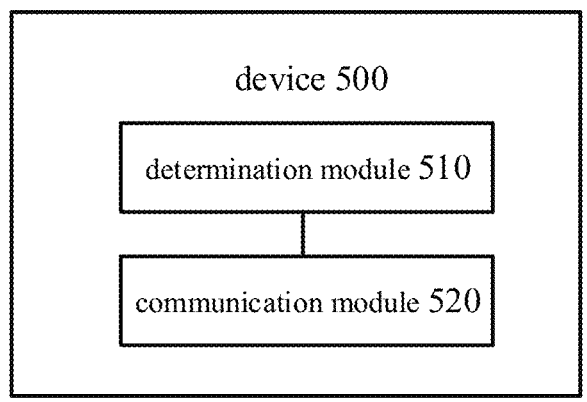
FIG. 6 shows a schematic block diagram of an information transmission device according to an embodiment of the present disclosure.

FIG. 6 shows a schematic block diagram of an information transmission device 500 according to an embodiment of the present disclosure. As shown in FIG. 6, the device 500 includes a determination module 510 and a communication module 520.

The determination module 510 is configured to perform channel detection on a first channel on an unlicensed carrier using a first beam and a first energy detection threshold to determine whether a first time domain resource used to send first information is available.

The communication module 520 is configured to, in a case where the first time domain resource is available, send the first information by the first time domain resource.

According to some embodiments, the first energy detection threshold is determined according to a first transmit power;

the communication module is configured to:

send the first information by the first time domain resource with a second transmit power, wherein the second transmit power is different from the first transmit power.

According to some embodiments, the communication module 520 is further configured to:

send the first information by the first time domain resource using a second beam, wherein the second beam is different from the first beam, and a direction corresponding to the second beam and a direction corresponding to the first beam at least partially overlap.

According to some embodiments, the first beam is a beam in a first beam set, and the second beam is a beam in a second beam set.

According to some embodiments, the direction corresponding to the first beam includes the direction corresponding to the second beam, and a coverage angle of the first beam is larger than a coverage angle of the second beam.

According to some embodiments, a beam gain of the first beam is smaller than a beam gain of the second beam, and the second transmit power is smaller than the first transmit power.

According to some embodiments, the second transmit power is equal to the first transmit power minus an adjustment amount, and the adjustment amount is based on a difference between the beam gain of the second beam and the beam gain of the first beam.

According to some embodiments, a beam gain of the first beam is greater than a beam gain of the second beam, and the second transmit power is equal to the first transmit power.

According to some embodiments, a beam gain of the first beam is greater than a beam gain of the second beam, and the second transmit power is greater than the first transmit power.

According to some embodiments, the second transmit power is equal to the first transmit power plus an adjustment amount, and the adjustment amount is determined based on a difference between the beam gain of the second beam and the beam gain of the first beam.

According to some embodiments, the communication module 520 is further configured to:

receive first indication information sent from a second device, wherein the first indication information is used to indicate information of the second beam; and the determination module 510 is further configured to determine information of the first beam according to the information of the second beam.

According to some embodiments, the communication module 520 is further configured to:

receive second indication information sent from the second device, wherein the second indication information is used to indicate the information of the first beam.

According to some embodiments, the communication module 520 is further configured to:

receive third indication information sent from the second device, wherein the third indication information is used to determine information of the second transmit power; and the determination module 510 is further configured to determine the first transmit power according to the information of the second transmit power.

According to some embodiments, the device 500 is a network device.

According to some embodiments, the device 500 is a terminal device.

It should be understood that the information transmission device 500 according to embodiments of the present disclosure may correspond to the first device in the method embodiments of the present disclosure, and the foregoing and other operations and/or functions of various units in the device 500 are respectively intended to realize the corresponding processes of the first device in the method 100. For the sake of brevity, repeated descriptions are omitted here.

Figure 7:
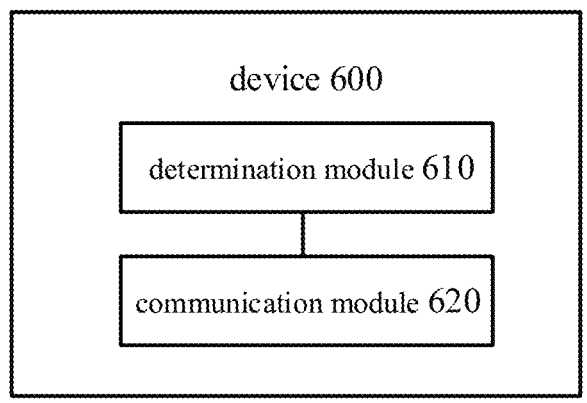
FIG. 7 shows a schematic block diagram of an information transmission device according to an embodiment of the present disclosure.

FIG. 7 shows a schematic block diagram of an information transmission device according to an embodiment of the present disclosure. As shown in FIG. 7, the device 600 includes a determination module 610 and a communication module 620.

The determination module 610 is configured to perform channel detection on a first channel on an unlicensed carrier using a first beam and a first energy detection threshold to determine whether a first time domain resource used to send first information is available.

The communication module 620 is configured to, in a case where the first time domain resource is available, if a coverage angle of the first beam is smaller than a coverage angle of a second beam used for data transmission, not send the first information by the first time domain resource, wherein a direction corresponding to the second beam and a direction corresponding to the first beam at least partially overlap.

According to some embodiments, the first beam is a beam in a first beam set, and the second beam is a beam in a second beam set.

According to some embodiments, the communication module 620 is further configured to:

receive first indication information sent from a second device, wherein the first indication information is used to indicate information of the second beam; and the determination module 610 is further configured to determine information of the first beam according to the information of the second beam.

According to some embodiments, the communication module 620 is further configured to:

receive second indication information sent from the second device, wherein the second indication information is used to indicate the information of the first beam.

According to some embodiments, the device 600 is a network device.

According to some embodiments, the device 600 is a terminal device.

Specifically, the device 600 may correspond to the first device described in the foregoing method 400 (for example, the device 600 may be configured in the first device, or the device 600 may be the first device described in the foregoing method 400), and each module or unit in the device 600 may be used to perform the actions or processes performed by the first device in the method 400, and for brevity, repeated descriptions are omitted here.

Figure 8:
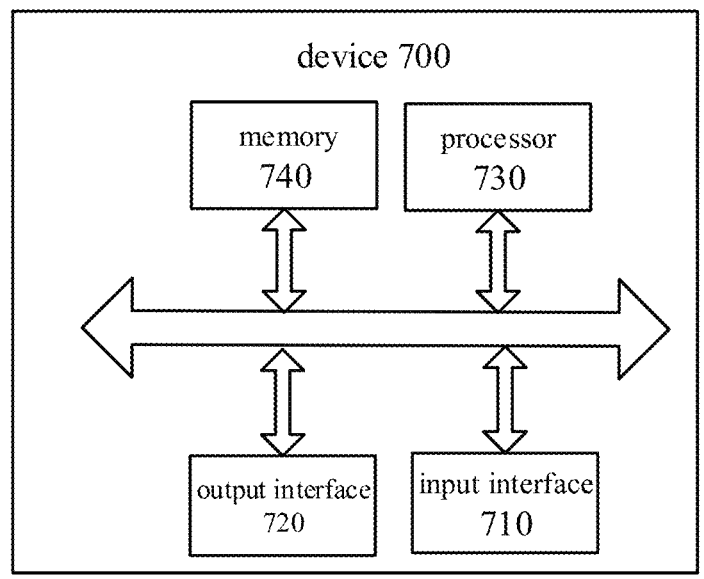
FIG. 8 shows a schematic block diagram of an information transmission device according to an embodiment of the present disclosure.

As shown in FIG. 8, an embodiment of the present disclosure also provides an information transmission device 700. The device 700 may be the device 500 in FIG. 6, which can be used to perform the processes corresponding to the first device in the method 100 as shown in FIG. 1. The device 700 includes an input interface 710, an output interface 720, a processor 730, and a memory 740. The input interface 710, the output interface 720, the processor 730, and the memory 740 may be connected by a bus system. The memory 740 is configured to store programs, instructions or codes. The processor 730 is configured to execute programs, instructions, or codes in the memory 740 to control the input interface 710 to receive signals, to control the output interface 720 to send signals, so as to complete operations in the foregoing method embodiments.

It should be understood that, in the embodiments of the present disclosure, the processor 730 may be a Central Processing Unit (CPU), and the processor 730 may also be other general-purpose processors, Digital Signal Processor (DSP), Application Specific Integrated Circuit (ASIC), Field Programmable Gate Array (FPGA) or other programmable logic device, discrete gate or transistor logic device, discrete hardware component, and so on. The general purpose processor may be a microprocessor or the processor may be any conventional processor or the like.

The memory 740 can include a read only memory and a random access memory and provides instructions and data to the processor 730. A portion of the memory 740 may also include a non-volatile random access memory. For example, the memory 740 can also store information of the device type.

During implementation, contents in the foregoing method embodiments can be completed by an integrated hardware logic circuit in the processor 730, or software instructions. The contents of the methods disclosed in the embodiments of the present disclosure can be directly completed by a hardware processor, or by a combination of hardware and software modules in the processor. The software modules can be located in a storage medium that is well-known in the art such as a random access memory, a flash memory, a read only memory, a programmable read only memory or an electrically erasable programmable memory, a register. The storage medium is located in the memory 740 and the processor 730 reads information in the memory 740 and completes the steps of the above-described methods with its hardware. For brevity, details are not provided here.

In a specific implementation, the determination module 510 included in the device 500 in FIG. 6 may be implemented by the processor 730 in FIG. 8, and the communication module 520 included in the device 500 in FIG. 6 may be implemented by the input interface 710 and the output interface 720 in FIG. 8.

Figure 9:
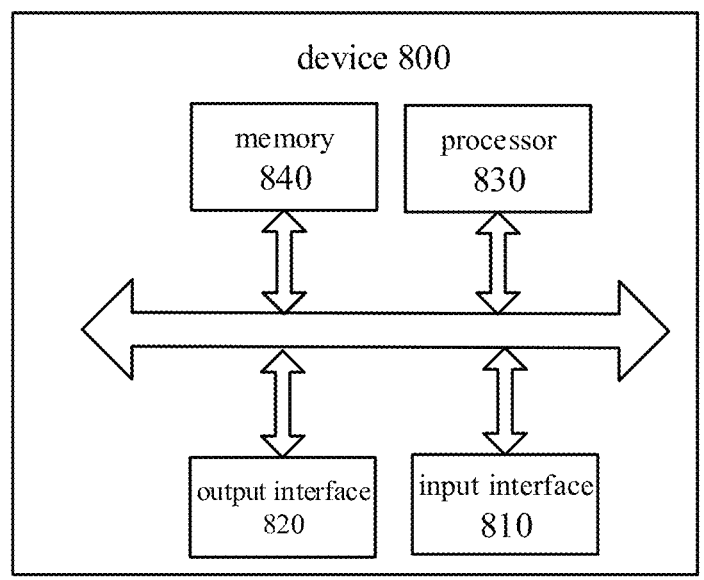
FIG. 9 shows a schematic block diagram of an information transmission device according to an embodiment of the present disclosure.

As shown in FIG. 9, an embodiment of the present disclosure also provides an information transmission device 800. The device 800 may be the device 600 in FIG. 7, which can be used to perform the processes corresponding to the first device in the method 400 in FIG. 4. The device 800 includes an input interface 810, an output interface 820, a processor 830, and a memory 840. The input interface 810, the output interface 820, the processor 830, and the memory 840 may be connected by a bus system. The memory 840 is configured to store programs, instructions or codes. The processor 830 is configured to execute programs, instructions or codes in the memory 840 to control the input interface 810 to receive signals, to control the output interface 820 to send signals, so as to complete operations in the foregoing method embodiments.

It should be understood that, in the embodiments of the present disclosure, the processor 830 may be a Central Processing Unit (CPU), and the processor 830 may also be other general-purpose processors, Digital Signal Processor (DSP), Application Specific Integrated Circuit (ASIC), Field Programmable Gate Array (FPGA) or other programmable logic device, discrete gate or transistor logic device, discrete hardware component, and so on. The general purpose processor may be a microprocessor or the processor may be any conventional processor or the like.

The memory 840 can include a read only memory and a random access memory and provides instructions and data to the processor 730. A portion of the memory 840 may also include a non-volatile random access memory. For example, the memory 840 can also store information of the device type.

During implementation, contents in the foregoing method embodiments can be completed by an integrated hardware logic circuit in the processor 830, or software instructions. The contents of the methods disclosed in the embodiments of the present disclosure can be directly completed by a hardware processor, or by a combination of hardware and software modules in the processor. The software modules can be located in a storage medium that is well-known in the art such as a random access memory, a flash memory, a read only memory, a programmable read only memory or an electrically erasable programmable memory, a register. The storage medium is located in the memory 840 and the processor 830 reads information in the memory 840 and completes the steps of the above-described methods with its hardware. For brevity, details are not provided here.

In a specific implementation, the determination module 610 included in the device 600 in FIG. 7 may be implemented by the processor 830 in FIG. 9, and the communication module 620 included in the device 600 in FIG. 7 may be implemented by the input interface 810 and the output interface 820 in FIG. 9.

An embodiment of the present disclosure also provides a computer-readable storage medium. The computer-readable storage medium stores one or more programs. The one or more programs include instructions. When the instructions are executed by a portable electronic device including a plurality of application programs, the portable electronic device is caused to perform the methods according to any one of the embodiments as shown in FIG. 1 to FIG. 5.

An embodiment of the present disclosure also provides a computer program. The computer program including instructions. When the computer program is executed by a computer, the computer is caused to perform corresponding process of the methods according to the embodiments shown in FIG. 1 to FIG. 5

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. An information transmission method, comprising:
   performing, by a first device, channel detection on a first channel on an unlicensed carrier using a first beam and a first energy detection threshold to determine whether a first time domain resource used for the first device to send first information is available; and
   in a case where the first time domain resource is available, sending, by the first device, the first information by the first time domain resource;
   wherein the first energy detection threshold is determined according to a first transmit power;
   wherein sending, by the first device, the first information by the first time domain resource, comprises:
   sending, by the first device, the first information by the first time domain resource with a second transmit power, wherein the second transmit power is different from the first transmit power.

2. The method according to claim 1, wherein sending, by the first device, the first information by the first time domain resource, comprises:
   sending, by the first device, the first information by the first time domain resource using a second beam, wherein the second beam is different from the first beam, and a direction corresponding to the second beam and a direction corresponding to the first beam at least partially overlap.

3. The method according to claim 2, wherein the first beam is a beam in a first beam set, and the second beam is a beam in a second beam set.

4. The method according to claim 2, wherein the direction corresponding to the first beam comprises the direction corresponding to the second beam, and a coverage angle of the first beam is larger than a coverage angle of the second beam.

5. The method according to claim 2, wherein a beam gain of the first beam is smaller than a beam gain of the second beam, and the second transmit power is smaller than the first transmit power.

6. The method according to claim 5, wherein the second transmit power is equal to the first transmit power minus an adjustment amount, and the adjustment amount is based on a difference between the beam gain of the second beam and the beam gain of the first beam.

7. The method according to claim 2, wherein a beam gain of the first beam is greater than a beam gain of the second beam, and the second transmit power is greater than or equal to the first transmit power.

8. The method according to claim 7, wherein the second transmit power is equal to the first transmit power plus an adjustment amount, and the adjustment amount is determined based on a difference between the beam gain of the second beam and the beam gain of the first beam.

9. The method according to claim 2, further comprising:
   receiving, by the first device, first indication information sent from a second device, wherein the first indication information is used to indicate information of the second beam; and
   determining, by the first device, information of the first beam according to the information of the second beam.

10. The method according to claim 2, further comprising:
    receiving, by the first device, second indication information sent from the second device, wherein the second indication information is used to indicate information of the first beam.

11. The method according to claim 2, further comprising:
    receiving, by the first device, third indication information sent from the second device, wherein the third indication information is used to determine information of the second transmit power; and
    determining, by the first device, the first transmit power according to the information of the second transmit power.

12. The method according to claim 1, further comprising:
    in a case where the first time domain resource is available, if a coverage angle of the first beam is smaller than a coverage angle of a second beam used for data transmission, the first device not sending the first information by the first time domain resource, wherein a direction corresponding to the second beam and a direction corresponding to the first beam at least partially overlap.

13. The method according to claim 12, further comprising:
    receiving, by the first device, first indication information sent from a second device, wherein the first indication information is used to indicate information of the second beam; and
    determining, by the first device, information of the first beam according to the information of the second beam.

14. An information transmission device, comprising a processor, a transceiver, and a memory for storing instructions that, when executed by the processor, cause the device to perform a plurality of operations comprising:

performing channel detection on a first channel on an unlicensed carrier using a first beam and a first energy detection threshold to determine whether a first time domain resource used to send first information is available; and in a case where the first time domain resource is available, sending the first information by the first time domain resource;

wherein the first energy detection threshold is determined according to a first transmit power;

wherein the plurality of operations comprises:

sending the first information by the first time domain resource with a second transmit power, wherein the second transmit power is different from the first transmit power.

15. The device according to claim 14, wherein the plurality of operations comprises:

sending the first information by the first time domain resource using a second beam, wherein the second beam is different from the first beam, and a direction corresponding to the second beam and a direction corresponding to the first beam at least partially overlap.

16. The device according to claim 15, wherein the direction corresponding to the first beam comprises the direction corresponding to the second beam, and a coverage angle of the first beam is larger than a coverage angle of the second beam.

17. The device according to claim 15, wherein a beam gain of the first beam is smaller than a beam gain of the second beam, and the second transmit power is smaller than the first transmit power.

18. The device according to claim 17, wherein the second transmit power is equal to the first transmit power minus an adjustment amount, and the adjustment amount is based on a difference between the beam gain of the second beam and the beam gain of the first beam.

* * * * *